United States Patent
Shirasaka et al.

(10) Patent No.: US 8,203,656 B2
(45) Date of Patent: Jun. 19, 2012

(54) TELEVISION AND ELECTRONIC APPARATUS

(75) Inventors: Hideo Shirasaka, Ome (JP); Tetsuhiko Fukazawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/080,491

(22) Filed: Apr. 5, 2011

(65) Prior Publication Data

US 2011/0310314 A1 Dec. 22, 2011

(30) Foreign Application Priority Data

Jun. 17, 2010 (JP) ................................. 2010-138590

(51) Int. Cl.
*H04N 5/64* (2006.01)
(52) U.S. Cl. ........................................................ 348/836
(58) Field of Classification Search ................... 348/836
See application file for complete search history.

(56) References Cited

U.S. PATENT DOCUMENTS

| | | | |
|---|---|---|---|
| 2004/0090560 A1* | 5/2004 | Jang | 348/836 |
| 2006/0066769 A1 | 3/2006 | Minaguchi et al. | |
| 2007/0091226 A1* | 4/2007 | Yamanaka | 349/60 |
| 2007/0103605 A1* | 5/2007 | Maruta | 348/797 |
| 2007/0195220 A1 | 8/2007 | Ono | |
| 2007/0216702 A1* | 9/2007 | Takahashi et al. | 345/582 |
| 2007/0241993 A1 | 10/2007 | Monden et al. | |
| 2007/0285878 A1 | 12/2007 | Konno et al. | |
| 2009/0128528 A1* | 5/2009 | Takata | 345/206 |

FOREIGN PATENT DOCUMENTS

| | | |
|---|---|---|
| JP | 11-338371 | 12/1999 |
| JP | 2001-272917 | 10/2001 |
| JP | 2004-299755 | 10/2004 |
| JP | 2006-99242 | 4/2006 |
| JP | 2006-331103 | 12/2006 |
| JP | 2007-249195 | 9/2007 |
| JP | 2007-286396 | 11/2007 |
| JP | 2007-328613 | 12/2007 |

* cited by examiner

*Primary Examiner* — Jay Au Patel
*Assistant Examiner* — Jessica Prince
(74) *Attorney, Agent, or Firm* — Blakely, Sokoloff, Taylor & Zafman LLP

(57) ABSTRACT

According to one embodiment, an electronic apparatus includes a housing, a display module, and a reception member. The housing includes a first inner surface and a second inner surface opposed to the first inner surface. The display module includes a unit being stacked on the first inner surface and accommodated in the housing and a panel being stacked on the unit and opposed to the second inner surface. The reception member projects from the first inner surface. The reception member includes a base and an extended portion. The base faces a side of the unit. The extended portion projects from the top of the base and faces a side of the panel. The extended portion includes a first periphery and a second periphery inclined toward the first periphery.

15 Claims, 8 Drawing Sheets

TELEVISION AND ELECTRONIC APPARATUS

CROSS-REFERENCE TO RELATED APPLICATIONS

This application is based upon and claims the benefit of priority from Japanese Patent Application No. 2010-138590, filed Jun. 17, 2010; the entire contents of which are incorporated herein by reference.

FIELD

Embodiments described herein relate generally to a television and an electronic apparatus.

BACKGROUND

An electronic apparatus, such as a television and a portable computer, has a display module to display images. The display module is for example a liquid crystal display (LCD) or a plasma display.

The display module is accommodated in a housing. Inside of the housing is provided with multiple ribs along the side of the display module. Those ribs receive the display module when the electronic apparatus falls.

To avoid the display module received by the ribs from breaking, an elastic cushion may be provided to the ribs or to the display module. This cushion acts between the ribs and the display module to reduce impacts that the display module suffers.

The display module has a glass panel to cover the display surface on which images are displayed. This glass panel is thin and fragile to impacts. Thus, it is requested to reduce external forces applied to the glass panel as much as possible.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an electronic apparatus includes a housing, a display module, and a reception member. The housing includes a first inner surface and a second inner surface opposed to the first inner surface. The display module includes a unit being stacked on the first inner surface and accommodated in the housing and a panel being stacked on the unit and opposed to the second inner surface. The reception member projects from the first inner surface. The reception member includes a base and an extended portion. The base faces a side of the unit. The extended portion projects from the top of the base and faces a side of the panel. The extended portion includes a first periphery and a second periphery inclined toward the first periphery.

The first embodiment will be explained hereinafter with reference to FIG. 1 to FIG. 6. In this specification, the near side to the user (that is, the user side) is defined as the front, the far side from the user is the rear, the left-hand side of the user is the left, the right-hand side of the user is the right, the upper side from the user's position is up and the lower side from the user's position is down.

Figure 1:
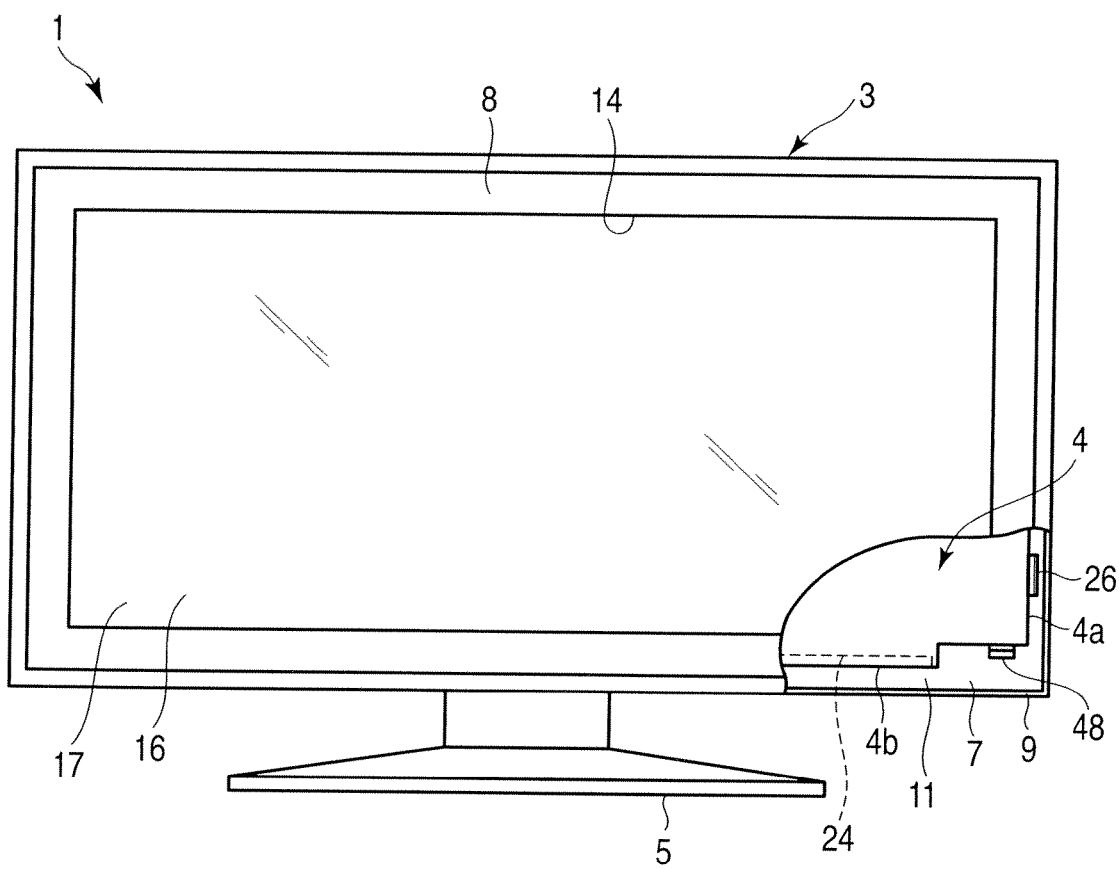
FIG. 1 is an exemplary front view of a television according to the first embodiment.
Figure 2:
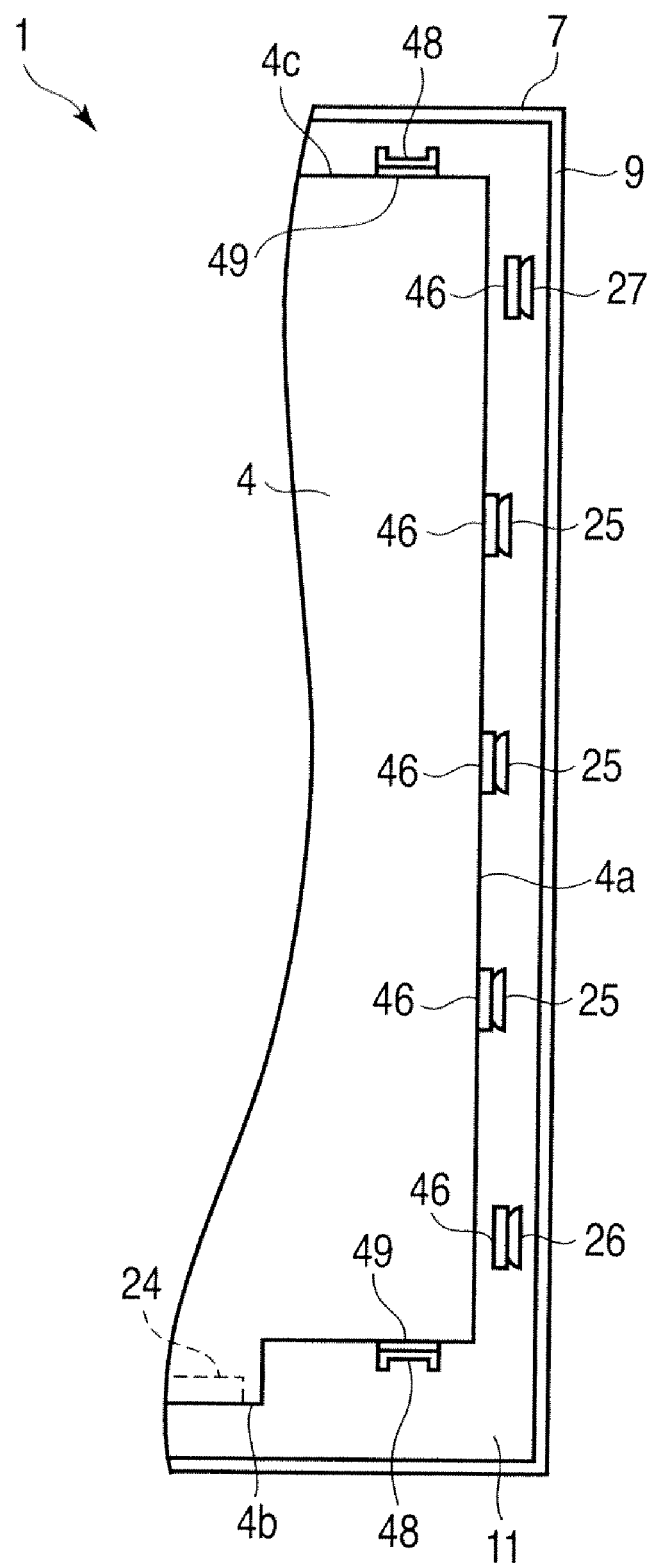
FIG. 2 is an exemplary front view of the television according to the first embodiment without a cover member.
Figure 3:
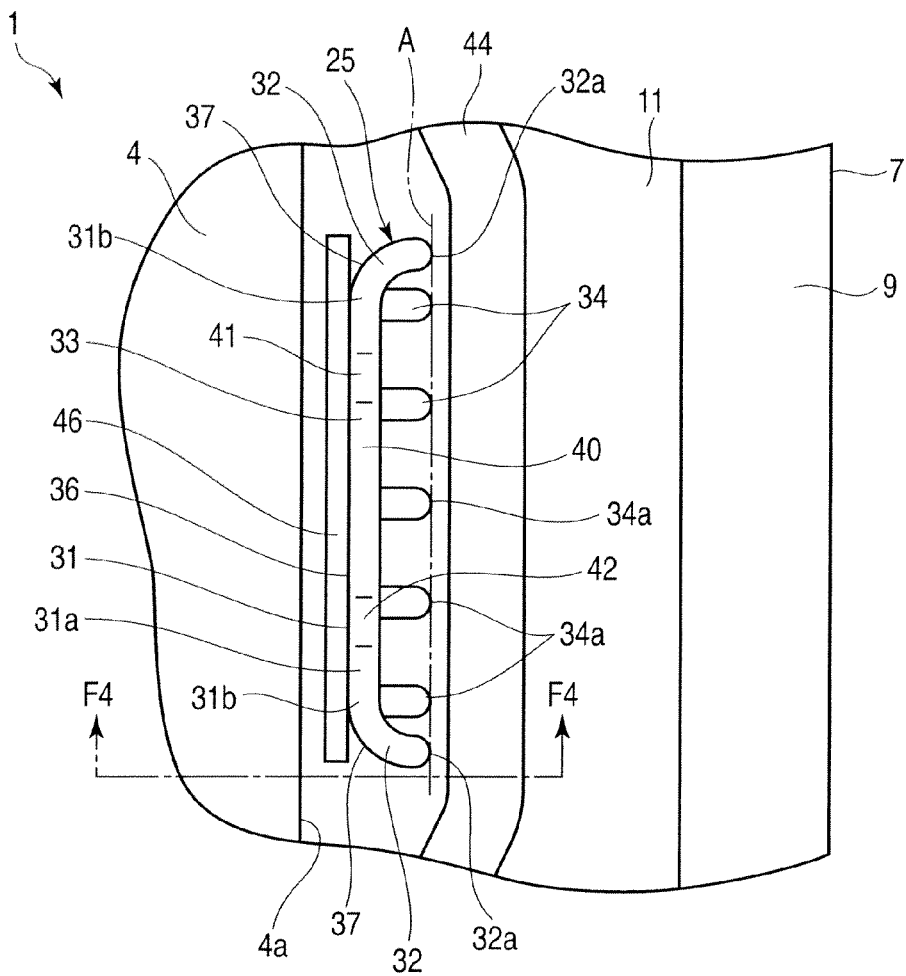
FIG. 3 is an exemplary enlarged front view of a part of the television according to the first embodiment.

FIG. 1 is a front view of a television 1 according to the first embodiment with a partial cutout. FIG. 2 is a front view of the television 1 without a cover member 8. FIG. 3 is a partial enlarged front view of the television 1 without the cover member 8. The television 1 is an example of televisions and electronic apparatuses. The television 1 comprises a liquid crystal display, for example. The television 1 may comprise a plasma display, or any other type of display.

As shown in FIG. 1, the television 1 comprises a housing 3, a display module 4 and a pedestal 5. The display module 4 is the liquid crystal display (LCD) and is accommodated in the housing 3. The pedestal 5 supports the housing 3.

The housing 3 comprises a base member 7 and a cover member 8. The base member 7 constitutes the back side of the housing 3. The base member 7 comprises walls 9 that constitute the sides of the housing 3. The cover member 8 is attached to the base member 7 and constitutes the front side of the housing 3.

The base member 7 is made of magnesium alloy, for example. The material of the base member 7 is not limited to magnesium alloy, but the base member 7 may be made of aluminum alloy, synthetic resin, or other materials. The base member 7 comprises a first inner surface 11. The display module 4 is attached to the first inner surface 11.

Figure 4:
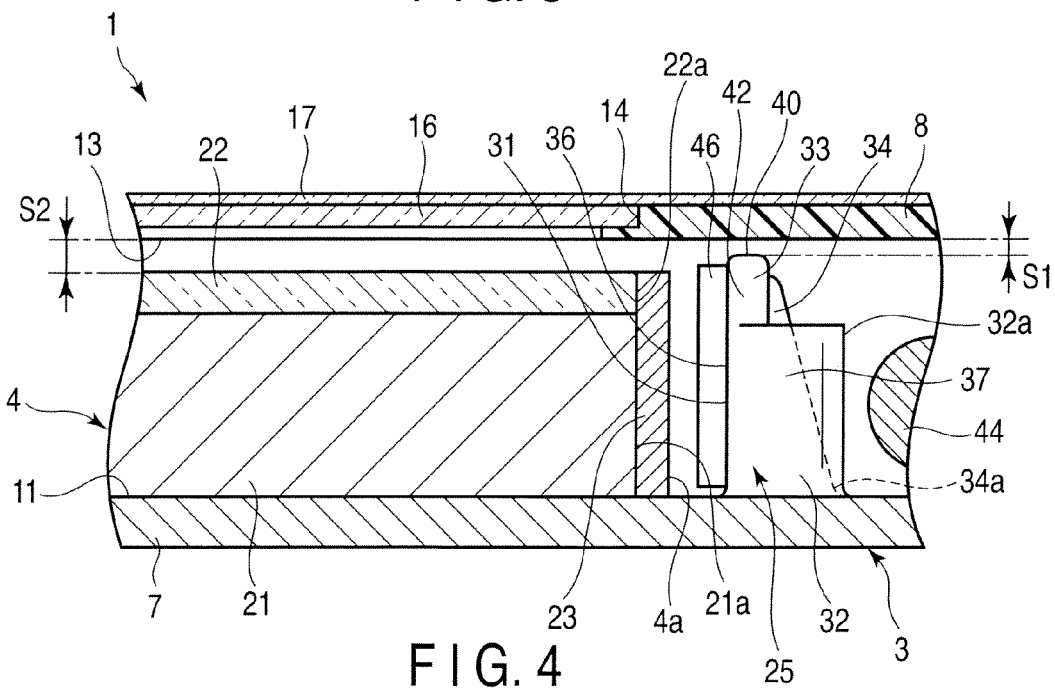
FIG. 4 is an exemplary sectional view of a part of the television taken along line F4-F4 of FIG. 3.

FIG. 4 is a partial sectional view of the television 1 along line F4-F4 of FIG. 3. As shown in FIG. 4, the cover member 8 comprises a second inner surface 13. The second inner surface 13 is opposed to the first inner surface 11. The cover member 8 comprises an opening 14 on the second inner surface 13.

The opening 14 is covered by a cover glass 16. The surface of the cover glass 16 and the outer surface of the cover member 8 are in almost the same plane. The cover member 8 and the cover glass 16 are covered by a transparent filter 17.

The display module 4 comprises a unit 21, a panel 22 and a frame 23. The unit 21 is made up of accumulated liquid crystals, a light source, and other parts, for example. The unit 21 is laid on the first inner surface 11. A cushion may be provided between the unit 21 and the first inner surface 11.

The panel 22 is a glass panel, for example. The panel 22 may be made of translucent materials, such as acrylic resin. The panel 22 is laid on the unit 21 and constitutes the display surface of the display module 4 on which images are displayed. The panel 22 is opposed to the second inner surface 13 and is exposed to the outside of the housing 3 from the opening 14.

The unit 21 and the panel 22 are fit into the frame 23. The frame 23 fixes the panel 22 to the unit 21. The frame 23 constitutes sides 4a of the display module 4.

As shown in FIG. 2, the display module 4 further comprises a fluorescent tube 24. The fluorescent tube 24 is provided inside of the unit 21 along with a bottom side 4b of the display module 4. The bottom side 4b is a side in the bottom of the display module 4. The fluorescent tube 24 is the light source for the display module 4.

A plurality of first reception members 25, second reception members 26 and third reception members 27 are provided to the first inner surface 11 of the base member 7. The first reception members 25 and the second reception members 26, the third reception members 27 are examples of a reception member and each of them is prominent on the first inner surface 11.

The first reception members 25, the second reception member 26 and the third reception member 27 are arranged along each of the right side 4a and the left side 4a of the display module 4. Thus, the first reception members 25, the second reception members 26 and the third reception members 27 are located at positions away from the positions corresponding to the fluorescent tube 24. The first reception members 25, the second reception members 26 and the third reception members 27 may be arranged along each of the bottom side 4b and an upper side 4c of the display module 4.

As shown in FIG. 2, the first reception members 25, the second reception member 26 and the third reception member 27 are lined with each of the sides 4a of the display module 4. The second reception member 26 is arranged in adjacent to the bottom side 4b of the display module 4. The third reception member 27 is arranged in adjacent to the upper side 4c of the display module 4. The first reception members 25 are arranged between the second reception member 26 and the third reception member 27.

The second reception member 26 and the third reception member 27 are placed farther from the display module 4 than the first reception member 25 is. The structure of the second reception member 26 and the third reception member 27 are the same as that of the first reception member 25. Accordingly, in the following explanation, the first reception member 25 will represent the other reception members.

Figure 5:
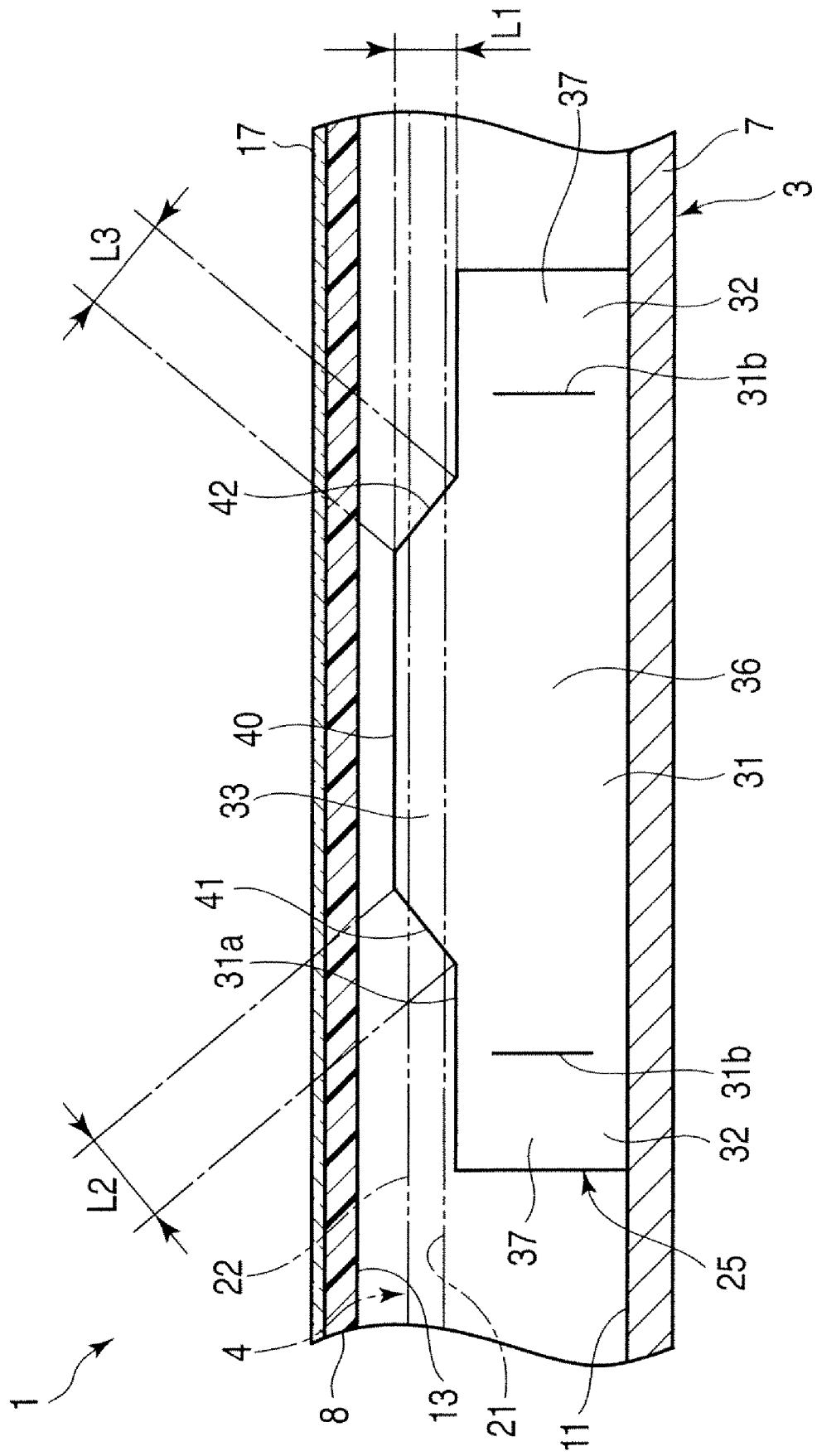
FIG. 5 is an exemplary front view of a first reception member according to the first embodiment.

FIG. 5 is a front view of one of the first reception member 25. In FIG. 5, the display module 4 is indicated by an alternate long and two short dashes line. As shown in FIG. 5, the first reception member 25 comprises a base portion 31, a pair of curved portions 32 and an extended portion 33. As shown in FIG. 3, the first reception member 25 further comprises a plurality of reinforcing portions 34.

The base portion 31 extends along the side 4a of the display module 4. As shown in FIG. 4, the base portion 31 comprises a flat opposite surface 36. The opposite surface 36 of the base portion 31 is opposed to a side 21a of the unit 21 of the display module 4 with the frame 23 between them.

The base portion 31 vertically projects from the first inner surface 11. The opposite surface 36 is opposed to the side 21a of the unit 21 with the frame 23 between them. The base portion 31 may project from the first inner surface 11 away from the vertical.

The base portion 31 has its distal end located away from the side 22a of the panel 22 in the direction toward the first inner face 11. In other words, the base portion 31 projects from the first inner surface 11 in a manner such that the projection is shorter than the thickness of the unit 21. The base portion 31 may face to the side 22a of the panel 22.

As shown in FIG. 5, the length from the first inner surface 11 to an edge 31a of the base portion 31 is less than the thickness of the unit 21. Meanwhile, as long as the base portion 31 falls outside of the side 22a of the panel 22 in a direction of the first inner surface 11, the base portion 31 may project from the first inner surface 11 beyond the level of the unit 21.

Each of the curved portions 32 is provided on the end 31b of the base member 31. As shown in FIG. 3, the curved portion 32 is curved in an arc and extended toward a direction which gets away from the display module 4. The curved portion 32 comprises a curved surface 37. The curved surface 37 is continuous with an opposite surface 36.

As shown in FIG. 5, the pair of curved portions 32 is projected vertically with respect to the first inner surface 11. The curved portions 32 may be inclined toward each other.

An extended portion 33 is projected from the edge 31a of the base portion 31 toward the second inner surface 13. The width of the extended portion 33 is less than the widths of the base portion 31 and the curved portion 32 put together. As shown in FIG. 4, the extended portion 33 faces a side 22a of the panel 22 of the display module 4 via the frame 23.

As shown in FIG. 3, the extended portion 33 extends along the side 4a of the display module 4. The extended portion 33 comprises a top 40, a first periphery 41 and a second periphery 42. The first periphery 41 and the second periphery 42 are an example of a first periphery and a second periphery, and they are an example of a pair of peripheries.

The top 40 is an edge of the extended portion 33 that projects. As shown in FIG. 4, the top 40 is formed flatly. The top 40 is opposed to the second inner surface 13.

As shown in FIG. 5, the first periphery 41 is inclined toward the second periphery 42. The second periphery 42 is inclined toward the first periphery 42. In other words, the first periphery 41 and the second periphery 42 are inclined toward each other.

Each of the first periphery 41 and the second periphery 42 is extended in a direction diagonally crossing the side 22a of the panel 22. As shown in FIG. 5, a length L1 from the lower edge of the extended portion 33 to the top 40 is less than a length L2 of the first periphery 41. Similarly, length L1 is less than a length L3 of the second periphery 42.

The extended part 33 is projected beyond the thickness of the panel 22 of the display module 4. As shown in FIG. 4, a space S1 between the extended portion 33 and the second inner surface 13 is narrower than a space S2 between the panel 22 and the second inner surface 13.

Each of a plurality of reinforcing portions 34 extends from the base portion 31 in a direction opposite to the display module 4. The reinforcing portion 34 ranges from the first surface 11, the base portion 31 and to the extended part 33.

As shown in FIG. 3, each of the plurality of reinforcing portions 34 comprises an end 34a. The end 34a of the reinforcing portion 34 is a tip of the reinforcing portion 34 projecting from the base portion 31. On the other hand, each of the pair of curved portions 32 comprises a tip 32a. The tip 32a of the curved portion 32 is a tip of the curved portion 32 projecting from the end 31b of the base portion 31.

The ends 34a of the reinforcing portion 34 are aligned on a line A indicated by alternate long and short dashed lines in FIG. 3. The tips 32a of the pair of curved portion 32 are also aligned on the line A. In short, the plurality of ends 34a of the reinforcing portion 34 and the tips 32a of the pair of curved portion 32 are aligned on the same line. The ends 34a of the reinforcing portion 34 and the tips 32a of the pair of curved portion 32 may be arranged out of alignment.

A wiring 44 is provided inside of the housing 3. The wiring 44 runs through a space between the display module 4 and the sidewall 9. As shown in FIG. 3, the wiring 44 goes around the first reception part 25 but runs between the first reception part 25 and the wall 9.

A plurality of elastic cushions 46 are attached to the base portion 31. The cushion 46 may be made of various shock-absorbing material formed from, for example, a synthetic rubber, sponge, cloth or a high polymer material.

The cushion 46 is glued to the opposite surface 36 of the base portion 31. The cushion 46 is held between the side 4a of the display module 4 and the first reception member 25.

The cushion 46 may attached to the side 4a of the display module 4. In this case, the cushion 46 is arranged at a position corresponding to the first reception member 25.

As shown in FIG. 3, the width of the cushion 46 is greater than that of the base portion 31. For this reason, each end of the cushion 46 is opposed to each of the curved portions 32. The cushion 46 is separated from each of the curved portions 32; however, the cushion 46 may be contacted with each of the curved portions 32.

As shown in FIG. 2, a plurality of supporting ribs 48 are provided on the first inner surface 11 of the base member 7. The supporting ribs 48 are arranged along the bottom side 4b and the upper side 4c of the display module 4.

The supporting rib 48 projects from the first inner surface 11 beyond the thickness of the unit 21. The supporting rib 48 is opposed to the side 21a of the unit 21 and the side 22a of the panel 22 but the frame 23 exists between the supporting rib 48 and each of the side 21a of the unit 21 and the side 22a of the panel 22.

The plurality of cushioning materials 49 are arranged between the plurality of supporting ribs 48 and the display module 4. The cushioning material 49 is attached to the supporting rib 48. The display module 4 is held between each of the plurality of supporting ribs 48 and the cushioning material 49.

The display module 4 is attached to the first inner surface 11 of the base portion 7 by being held by the supporting ribs 48. Not limited to this, the display module 4 may be screwed into, for example, the base portion 7.

According to the television 1 comprising the above structures, when the television 1 receives an impact, the first reception members 25 receive the display module 4 via the cushion 46. When the first reception member 25 receives the display module 4, the cushion 46 between the first reception member 25 and the display module 4 absorbs the impact.

The display module 4 may be lopsided with respect to the housing 3 by an impact. In this case, the display module 4 will be lopsided along one of the curved surface 37 of the curved portion 32. As the cushion 46 faces the pair of the curved portions 32, the cushion 46 is held by the lopsided display module 4 and one of the curved portions 32. The lopsided display module 4 is received by the second reception member 26 or the third reception member 27.

The panel 22 of the display module 9 is received by the extended portion 33 via the cushion 46. The first periphery 41 and the second periphery 42 are inclined toward each other, and they extend in a direction so as to cross diagonally the side 22a of the panel 22. When the panel 22 is received, a stress is concentrated to a part of the panel 22 that is received by the first periphery 41 and the second periphery 42.

The stress concentration to the panel 22 disperses as the length of the first periphery 41 or the second periphery 42 becomes greater. Length L2 of the first periphery 91 and length L3 of the second periphery 42 are greater than length L1 from the bottom edge of the extended portion 33 to the top of 40. For this reason, the stress concentration to the panel 22 can be reduced.

Figure 6:
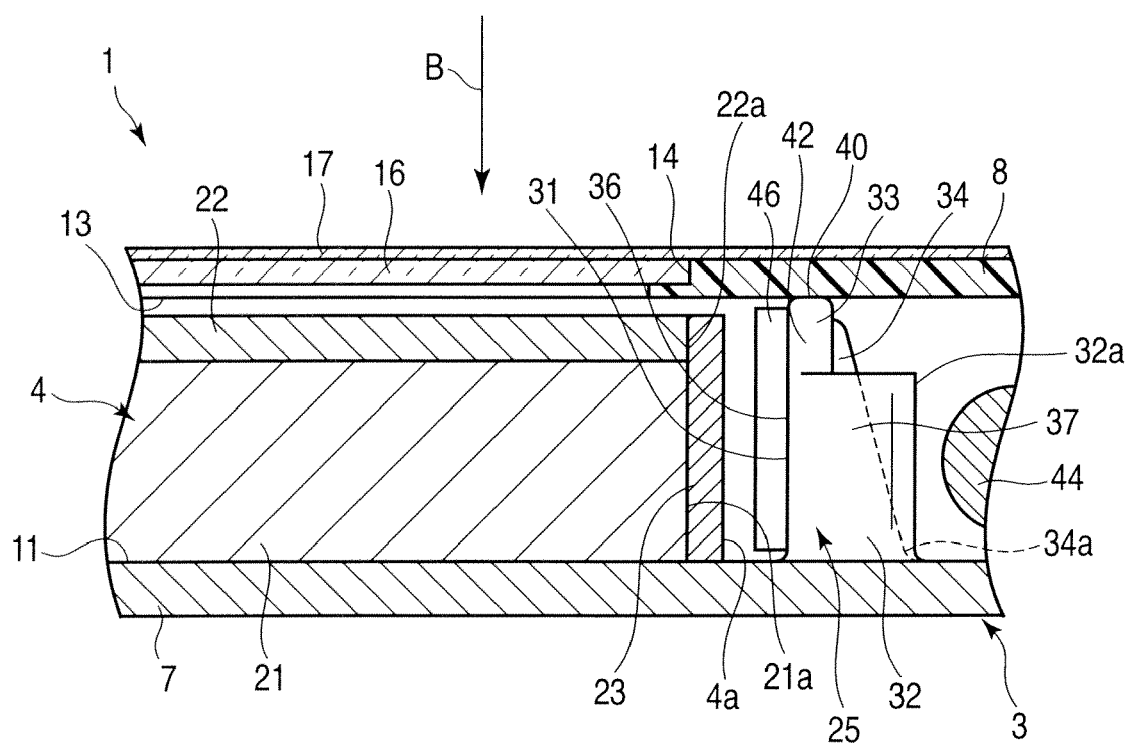
FIG. 6 is an exemplary sectional view showing a cover member of the television according to the first embodiment when an outer force is applied to the cover member.

FIG. 6 is a sectional view showing an inner structure of the television 1 when an external force is applied to the cover member 8. For example, if an external force is applied to the cover member 8 in a direction indicated by an arrow B in FIG. 6, the cover member 8 will be bent in a direction indicated by the arrow B. The arrow B is directed to a rear of the television 1.

If the cover member 8 is bent, the top 40 of the extended portion 33 will be contacted with the second inner surface 13 of the cover member 8. When the top 40 touches the second inner surface 13, the first reception member 25 supports the cover member 8. At this moment, a gap is generated between the panel 22 and the second inner surface 13. For this reason, the panel 22 can be avoided from breaking by the cover member 8. As explained above, the display module 4 can be prevented from breaking.

Next, the second embodiment will be described below with reference to FIG. 7 to FIG. 9. In the following, the same reference numerals shall be used to indicate the same constituent parts that have the same function as those of the television 1 of the first embodiment, and explanation of the constituent parts of the second embodiment will be omitted.

Figure 7:
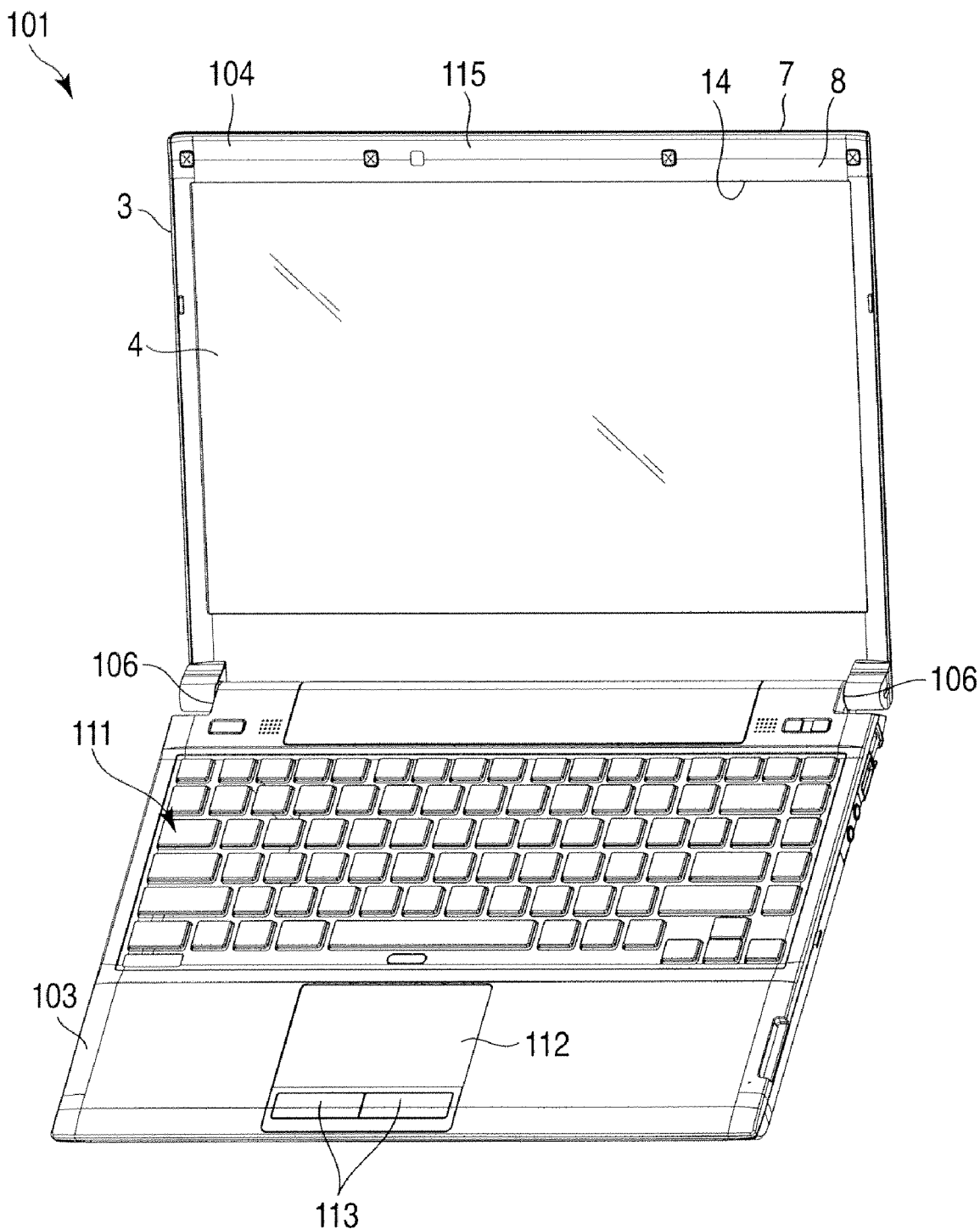
FIG. 7 is an exemplary perspective view of a portable computer according to the second embodiment.

FIG. 7 is a perspective view of a portable computer 101 according to the second embodiment. The portable computer 101 is an example of electronic device. As shown in FIG. 7, the portable computer 101 comprises a first unit 103 and a second unit 104.

The first unit 103 and the second unit 104 are connected via a hinge 106. The hinge 106 is arranged on the rear end of the first unit 103. The second unit 104 opens and closes by the hinge 106 within a range between the close position and the open position.

At the close position, the second unit 104 lay over the first unit 103. At the open position, the second unit 104 rises from the rear end of the first unit 103.

The first unit 103 comprises a keyboard 111, a trackpad 112 and a pair of buttons 113. The keyboard 111, the trackpad 112 and the pair of buttons 113 are arranged on the upper surface of the first unit 103.

The second unit 104 comprises a flat, box-shaped housing 3 and a display module 4. The housing comprises a base member 7 and a cover member 8. The display module 4 is accommodated in the housing 3. An inner surface 115 of the cover member 8 comprises an opening 14. The inner surface 115 is opposed to the first unit 103 at the close position.

Figure 8:
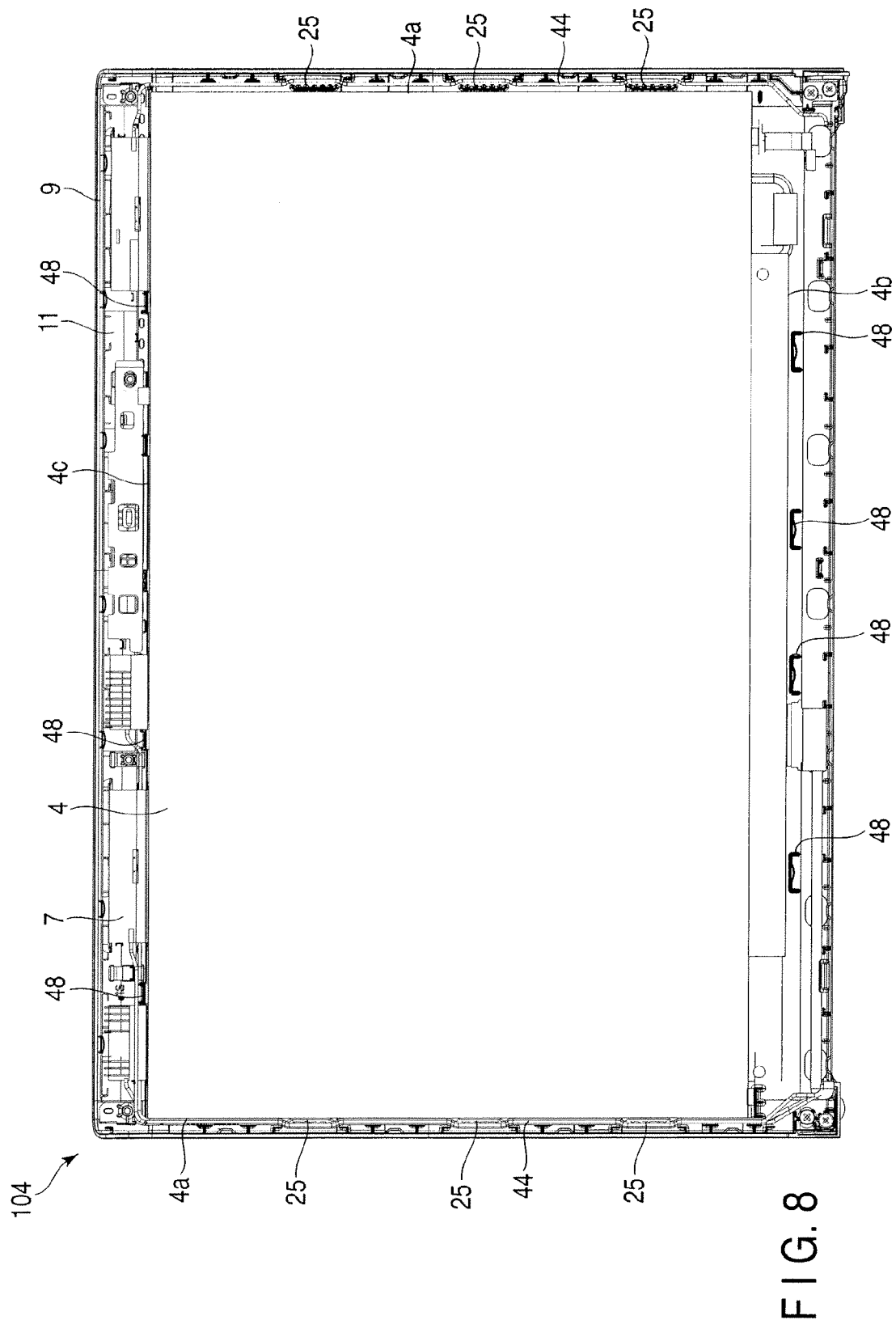
FIG. 8 is an exemplary plan view of a second unit according to the second embodiment without a cover member.

FIG. 8 is a plan view of the second unit 104 without the cover member 8. As shown in FIG. 8, the display module 4 is attached to the base member 7. The display module 4 comprises LEDs instead of a fluorescent tube 24.

Figure 9:
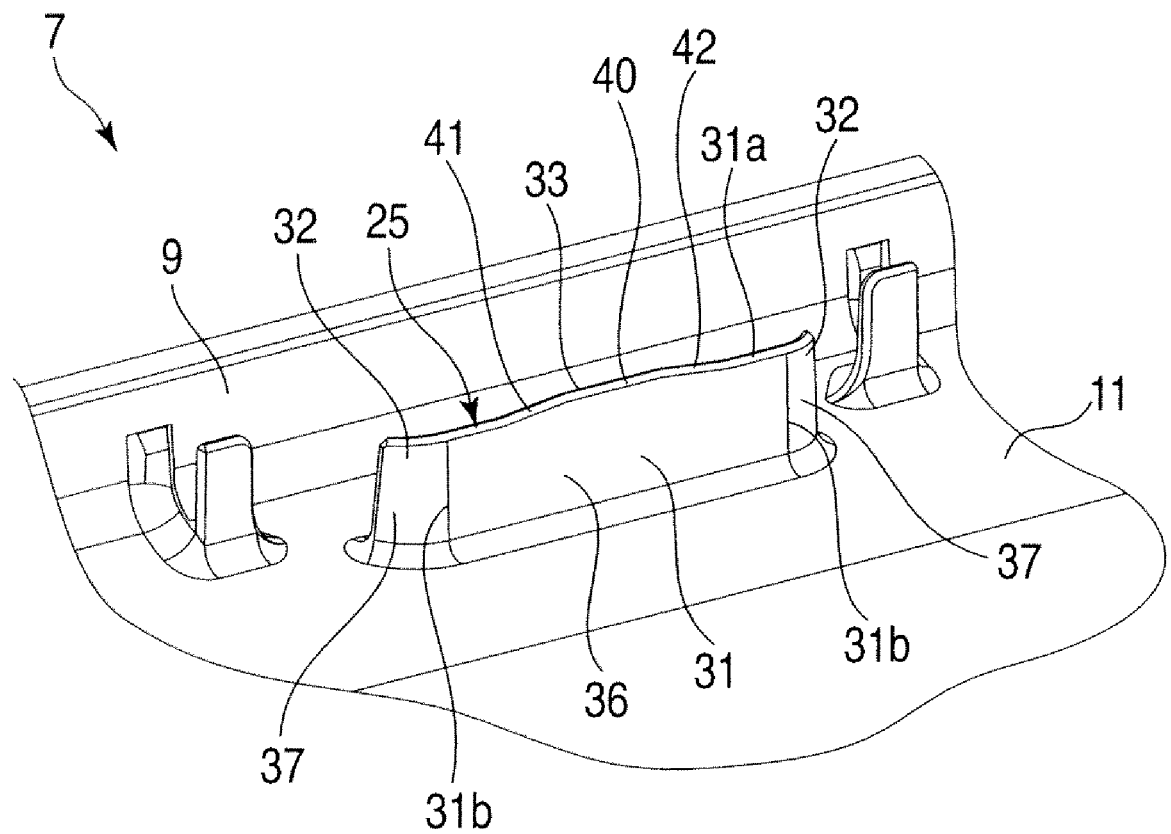
FIG. 9 is an exemplary enlarged perspective view of a part of a base member according to the second embodiment.

FIG. 9 is a partially enlarged perspective view of the base member 7. A plurality of first reception members 25 are provided on the inner surface 11 of the base member 7. As can be seen, the first reception member 25 can be used not only for the television 1 but also by the portable computer 101.

An electronic device is not limited to a television or a portable computer. A monitor or a mobile phone may be selected as an electronic device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A television comprising:
   a housing comprising a first inner surface and a second inner surface opposed to the first inner surface;
   a display module comprising a unit being stacked on the first inner surface and accommodated in the housing and a panel being stacked on the unit and opposed to the second inner surface; and
   a reception member projecting from the first inner surface, the reception member comprises:
   a base facing a side of the unit,
   a curved portion being provided on an edge of the base and curved in a direction opposite to the display module, and
   an extended portion projecting from the top of the base and facing a side of the panel, the extended portion comprising a pair of peripheries which are inclined toward each other.

2. The television of claim 1, wherein a space between the extended portion and the second inner surface is narrower than a space between the panel and the second inner surface.

3. The television of claim 1 further comprising a cushion positioned between the reception member and the side of the display module.

4. The television of claim 2 further comprising a cushion being held between the reception member and the side of the display module.

5. An electronic apparatus comprising:
   a housing comprising a first inner surface and a second inner surface opposed to the first inner surface;
   a display module comprising a unit being stacked on the first inner surface and accommodated in the housing and a panel being stacked on the unit and opposed to the second inner surface; and
   a reception member projecting from the first inner surface, wherein the reception member comprises:
   a base facing a side of the unit, and
   an extended portion projecting from the top of the base and facing a side of the panel, the extended portion comprising a first periphery and a second periphery inclined toward the first periphery.

6. The electronic apparatus of claim 5, wherein the reception member further comprises a curved portion being provided on the edge of the base and curved in a direction opposite to the display module.

7. The electronic apparatus of claim 6, wherein a space between the extended portion and the second inner surface is narrower than a space between the panel and the second inner surface.

8. The electronic apparatus of claim 7 further comprising a cushion being held between the reception member and the side of the display module.

9. The electronic apparatus of claim 8, wherein the cushion is attached to the base and faces the curved portion.

10. The electronic apparatus of claim 9, wherein the reception member further comprises a reinforcing member extended from the base in an opposite direction of the display module, and the reinforcing member is provided ranging from the first inner surface to the base portion.

11. The electronic apparatus of claim 5, wherein the base comprises a distal end located away from the side of the panel in a direction toward the first inner surface.

12. The electronic apparatus of claim 10, wherein the base comprises a distal end located away from the side of the panel in a direction toward the first inner surface.

13. The electronic apparatus of claim 5, wherein the extended portion exists between the edges of the base.

14. The electronic apparatus of claim 5, wherein the extended portion is formed in a shape of a trapezoid.

15. The electronic apparatus of claim 5, wherein the distance from the top of the base to the top of the extended portion is greater than the thickness of the panel.

* * * * *